(12) United States Patent
Andregg et al.

(10) Patent No.: US 10,274,989 B2
(45) Date of Patent: Apr. 30, 2019

(54) WAVELENGTH MULTIPLEXED MATRIX-MATRIX MULTIPLIER

(71) Applicant: Fathom Computing, Atherton, CA (US)

(72) Inventors: William Andregg, Palo Alto, CA (US);
Michael Andregg, Woodside, CA (US);
Robert T. Weverka, Boulder, CO (US);
Lionel Clermont, Liege (BE)

(73) Assignee: Fathom Computing, Palo Alto, CA (US)

( * ) Notice: Subject to any disclaimer, the term of this patent is extended or adjusted under 35 U.S.C. 154(b) by 6 days.

(21) Appl. No.: 15/783,986

(22) Filed: Oct. 13, 2017

(65) Prior Publication Data

US 2018/0107237 A1  Apr. 19, 2018

Related U.S. Application Data

(60) Provisional application No. 62/407,931, filed on Oct. 13, 2016.

(51) Int. Cl.
*G06E 1/04* (2006.01)
*G06G 7/16* (2006.01)
*G02F 3/02* (2006.01)
*G06E 3/00* (2006.01)

(52) U.S. Cl.
CPC .............. *G06E 1/045* (2013.01); *G02F 3/02* (2013.01); *G06E 3/008* (2013.01); *G06G 7/16* (2013.01)

(58) Field of Classification Search
CPC ........... G06E 1/045; G06E 3/008; G02F 3/02; G06G 7/16
USPC ............................................ 708/839, 7, 191
See application file for complete search history.

(56) References Cited

U.S. PATENT DOCUMENTS

| 4,592,004 A | * | 5/1986 | Bocker | ............... G06E 1/045 359/107 |
| 8,027,587 B1 | * | 9/2011 | Watts | ................ G02B 6/12007 359/107 |

* cited by examiner

*Primary Examiner* — Tan V Mai
(74) *Attorney, Agent, or Firm* — Macheledt Bales LLP; Jennifer L. Bales (57) ABSTRACT

Optical systems for performing matrix-matrix multiplication in real time utilizing spatially coherent input light and wavelength multiplexing.

20 Claims, 8 Drawing Sheets

WAVELENGTH MULTIPLEXED MATRIX-MATRIX MULTIPLIER

BACKGROUND OF THE INVENTION

Field of the Invention

The present invention relates to optical systems for real-time matrix-matrix multiplication. In particular, the present invention relates to wavelength multiplexed matrix-matrix multiplication systems using spatially coherent light sources.

Discussion of Related Art

Figure 1A:
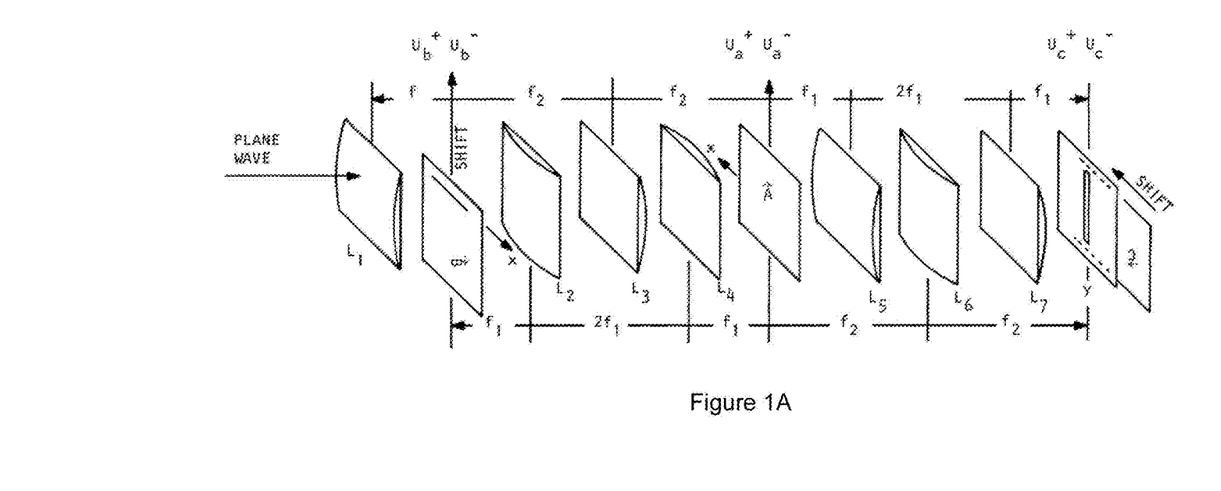
FIGS. 1(a) and 1(b) (prior art) show a vector-matrix multiplications system used to accomplish matrix-matrix multiplication in a series of steps.
Figure 1B:
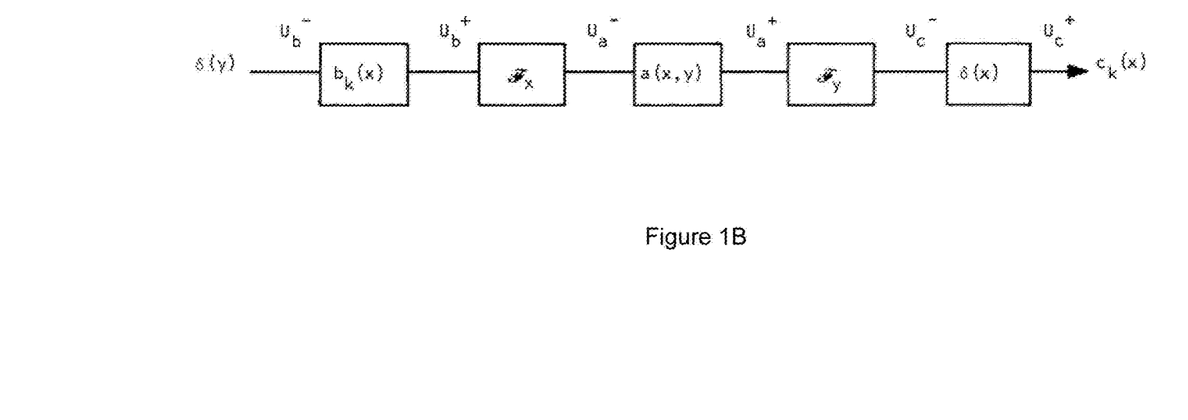

In the 1970s P. N. Tamura and J. C. Wyant described optical systems for multiplying a matrix by a matrix in a series of steps (only vector-matrix multiplication in real-time is accomplished. To perform matrix-matrix multiplication, a mechanical system is necessary). FIGS. 1(a) and 1(b) (prior art) show an example from "Two-Dimensional Matrix Multiplication using Coherent Optical Techniques," Optical Engineering, Vol. 18, No. 2, March-April 1979, pp. 198-204. FIG. 1(a) is a side isometric schematic drawing showing the optical elements of the system. FIG. 1(b) is a flow diagram showing the functions performed. A plane wave is focused to a line by a cylindrical lens L1. The matrix B element is movable vertically to allow one row of matrix B (i.e. a vector) to be illuminated and pass through the system at a time. Matrix B and matrix A were implemented as transparencies. A horizontally sliding slit at the system exit selects the appropriate result column for that vector. lenses L1, L3 and L6 are used to perform the fundamental mathematical operations, and the lenses L2, L4, L5 and L6 used in 4F-setups to avoid diffraction issues. Group $L_2L_3L_4$ takes an image in x and Fourier transform in y. Group $L_5L_6L_7$ takes an image in y and Fourier transform in x.

A need remains in the art for apparatus and methods to accomplish matrix-matrix multiplication in a single set of operations.

SUMMARY

It is an object of the present invention to provide apparatus and methods to accomplish matrix-matrix multiplication in real time. Real-time matrix-matrix multiplication according to the present invention uses a spatially coherent light source and wavelength multiplexing.

An application might involve the use of the matrix-matrix multiplier to compute activity in an artificial neural network.

Aspects of the present disclosure are directed towards parallel multiplication of a set of vectors using a spectral representation for the different vectors. The use of the spectral multiplexing with coherent fan-in allows the system to scale to a large number of independent vectors. The concurrent multiplication of many vectors by a matrix may be considered equivalent to a matrix-matrix multiply.

Embodiments provide an electro optical computing system that multiplies a K×L matrix by an L×M matrix in parallel. As a feature, this is done this with K, L, and M large and of the order of magnitude of the transverse spatial resolution of the optical system. The parallel multiplication of these matrices allows the electro optical computing system to perform K×L×M multiplications per clock cycle. These parallel multiplications can be achieved using a spatial light modulator with L×M degrees of freedom, by encoding the K degrees of freedom of the first matrix in a dense wavelength coding. This feature is a compelling reason to use optical processing since that parallelism is difficult to achieve otherwise.

Spatial coherent input light allows the summations of each vector-matrix multiply within the matrix-matrix multiplication to efficiently collect light onto a narrow column of the output. This allows the system to have a large number of simultaneous wavelengths and output vectors.

As used in this specification, "coherent" shall mean spatially coherent.

A method of optically performing matrix-matrix multiplications includes the steps of, providing spatially coherent light, separating the light by wavelength in a first dimension of space, and spreading the light in a second dimension of space. Tt this point the first matrix applies its values to the amplitude of the light. Different wavelengths are modulated by different matrix rows;

Next, the modulated light is combined by wavelength over the first dimension and spread over the first dimension. Then the second matrix applies its values to the combined and spread modulated light—matrix rows are applied across the second dimension and matrix columns are applied across the first dimension. Then the amplitudes of light are added over the second dimension and filtering is applied to filter out light that is not part of the added amplitudes of light and the added amplitudes of light are separated by wavelength in the second dimension. The result is matrix1 ×matrix2.

In some embodiments, the first dimension is the vertical dimension and the second dimension is the horizontal dimension. In other cases the first dimension would comprise something like a coarsely-spaced sparse-array rastered horizontically and vertically and the second dimension is a series of offset copies of the sparse-array. Or one of the dimensions is a rastered array of rastered subarrays.

For quick performance, matrix values may be obtained from a backplane with a local memory. Filtering may be accomplished with a space variant spectral filter, with a slit, or with an array of pinholes.

The modulators might be any of the following or some combination: transmissive spatial light modulators, reflective spatial light modulators, and/or multi-quantum-well spatial light modulators. The separating and combining steps might be accomplished using gratings. In some embodiments it is useful to polarize the light and use the polarization to route the light. Some designs require only two cylindrical lenses.

DETAILED DESCRIPTION OF THE PREFERRED EMBODIMENTS

Figure 2:
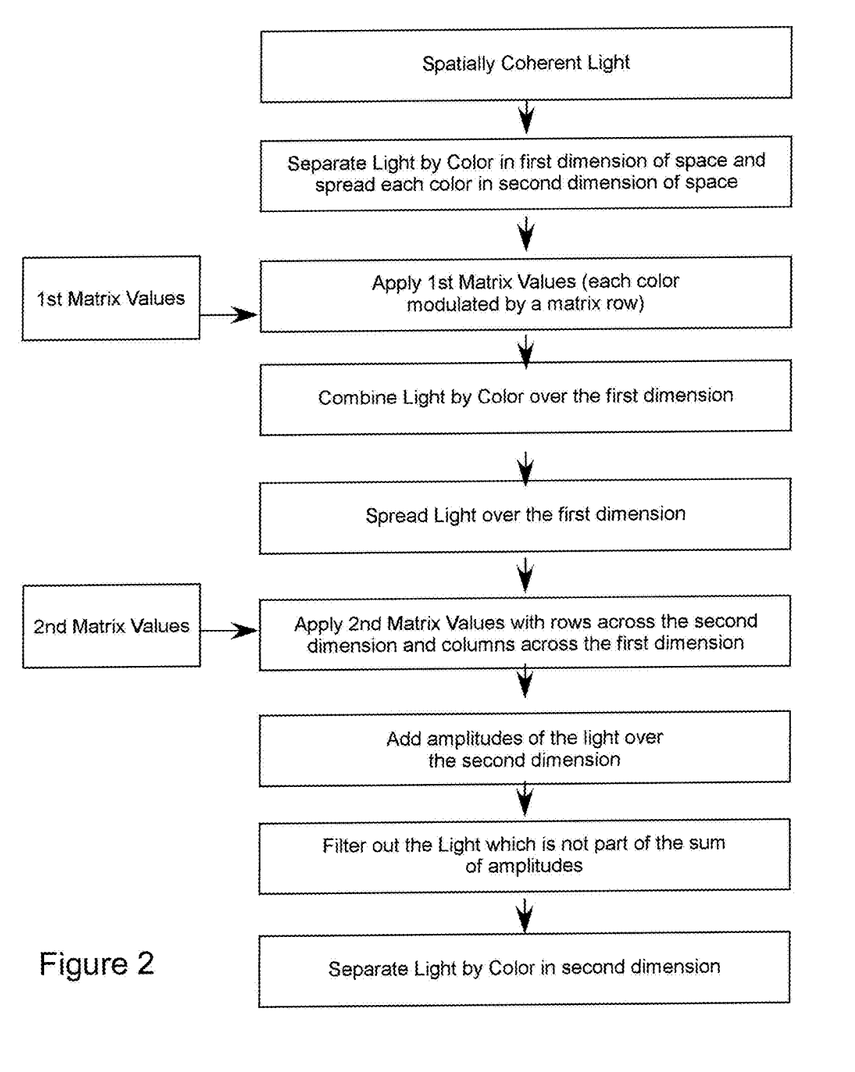
FIG. 2 is a flow diagram showing the overall process of the present invention.

FIG. 2 is a flow diagram showing the overall process of the present invention. The wavelength multiplexed matrix-matrix multiplier utilizes a spectrum of colors or wavelengths to turn an optical vector-matrix multiplier into a matrix-matrix multiplier. The system uses, for example, two 2-dimensional spatial light modulators to input the elements of a first and second matrix to be multiplied. The system uses space and spectral components to represent the rows and columns of the first matrix and it uses elements in two dimensions of space to represent the rows and columns of the second matrix. A coherent, broadband optical source is broadcast, spread by wavelength, and dispersed to the first spatial light modulator. The spectral components are dispersed to the spatial light modulator elements representing the rows of the first matrix and broadcast coherently to the spatial light modulator elements representing the columns of the first matrix. After modulation by the first spatial light modulator, the light is transmitted to the second spatial light modulator. The light at every spectral component is broadcast to the elements of the second spatial light modulator representing the columns of the second matrix and the light from the first spatial light modulator elements representing the rows is imaged to the elements of the second spatial light modulator representing the rows of the second matrix. After modulation by the second spatial light modulator, the optical system performs a coherent integration across the elements of the second spatial light modulator representing the columns of the second matrix, disperses the spectral elements, and images the elements of the second spatial light modulator representing the rows of the second matrix, to give the matrix-matrix product.

Figure 3:
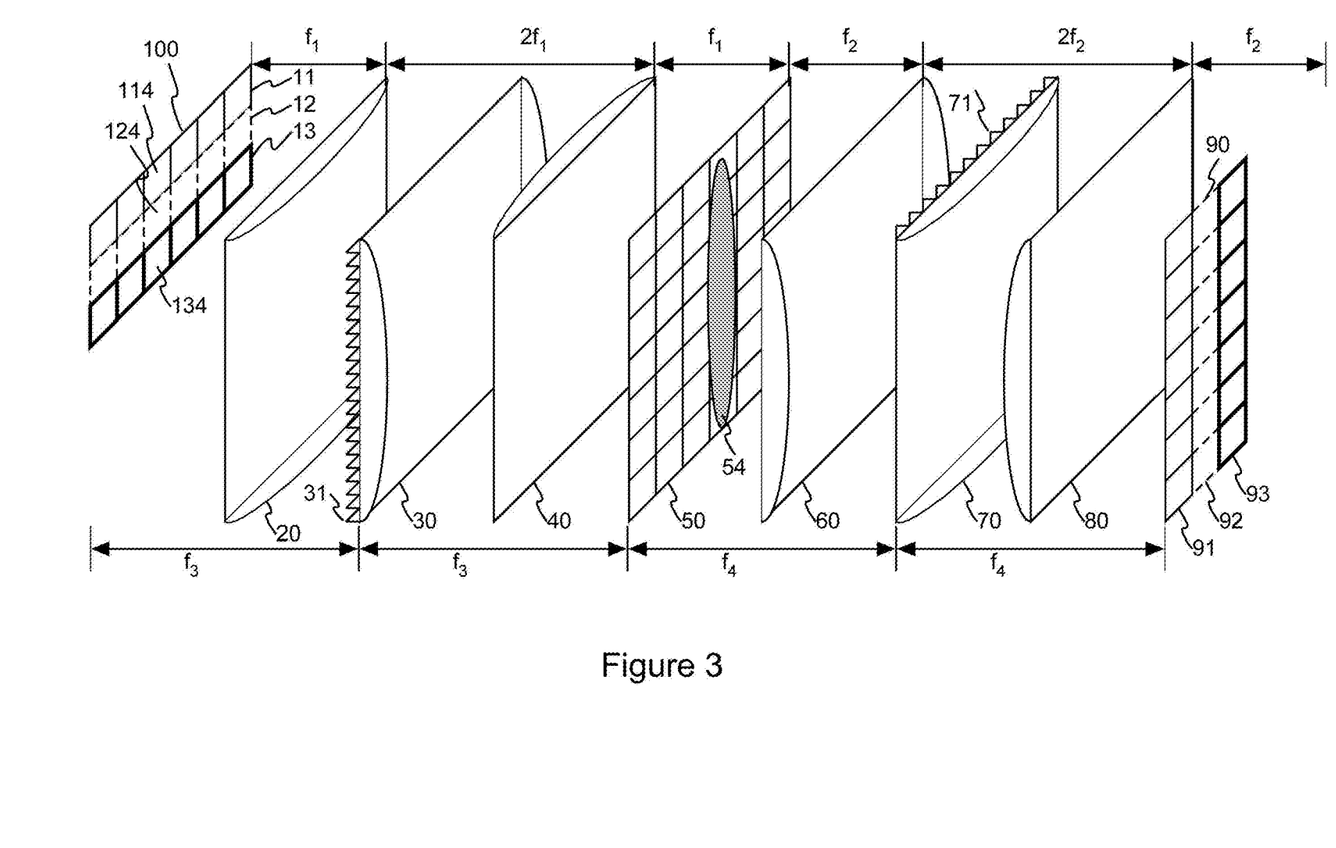
FIG. 3 shows an embodiment of a wavelength multiplexed matrix-matrix multiplier, using a space variant spectral filter to create the summations, and using transmission spatial light modulators.

FIG. 3 shows an embodiment of the wavelength-multiplexed optical matrix-matrix multiplier. Input spatial light modulator 100 is illuminated by light which is spectrally dispersed in the vertical dimension, and preferably substantially phase flat in the horizontal dimension. Only the rows of the spatial modulator which modulate the first three wavelengths 11, 12 and 13 are shown for clarity. The spatial light modulator 100 modulates the light on each pixel by the matrix elements $A_{kl}$. The cylinder lenses 20 and 40 image light in the input spatial light modulator 100 columns and the cylinder lens 30 collimates light from each row of the input spatial light modulator and broadcasts it to the column on the second spatial light modulator 50. In this manner, light from the pixels 114, 124, and 134 illuminate row 54 of the second spatial light modulator 50. An optional grating 31, may be used with the cylinder lens 30 to improve light efficiency by steering the light to be normal to spatial light modulator 50. The spatial light modulator 50 modulates the light on each pixel by the matrix elements $B_{lm}$. The cylinder lenses 60 and 80 image light in the second spatial light modulator rows and the cylinder lens 70 focuses light from each row onto an output centered on an element of a single column on the output filter 90. The focusing performed by cylinder lens 70 of the coherent light from the second spatial light modulator 50 is performing an optical Fourier transform. The grating 71 deflects the light horizontally so that each of the wavelengths is directed to an element of a different output column. Finally the space variant spectral filter 90 passes light of a portion of the spectrum at each of the column outputs. The space variant spectral filter is arranged to select the portion of the spectrum whose focused output is centered at that column. The space variant spectral filter thus passes the central lobe of the Fourier transform of the row of spatial light modulator 50, and the light in that central lobe is proportional to the sum of the values emitted by the row. In this manner the vector on row 11 multiplies the matrix on spatial light modulator 50 and the summation across columns is the filtered portion of the spectrum output at column 91. Similarly the vectors at rows 12 and 13 result in outputs at columns 92 and 93. The light passes by the filter may be detected to give the matrix output $C_{km} = \Sigma_l A_{kl} B_{lm}$.

Figure 4:
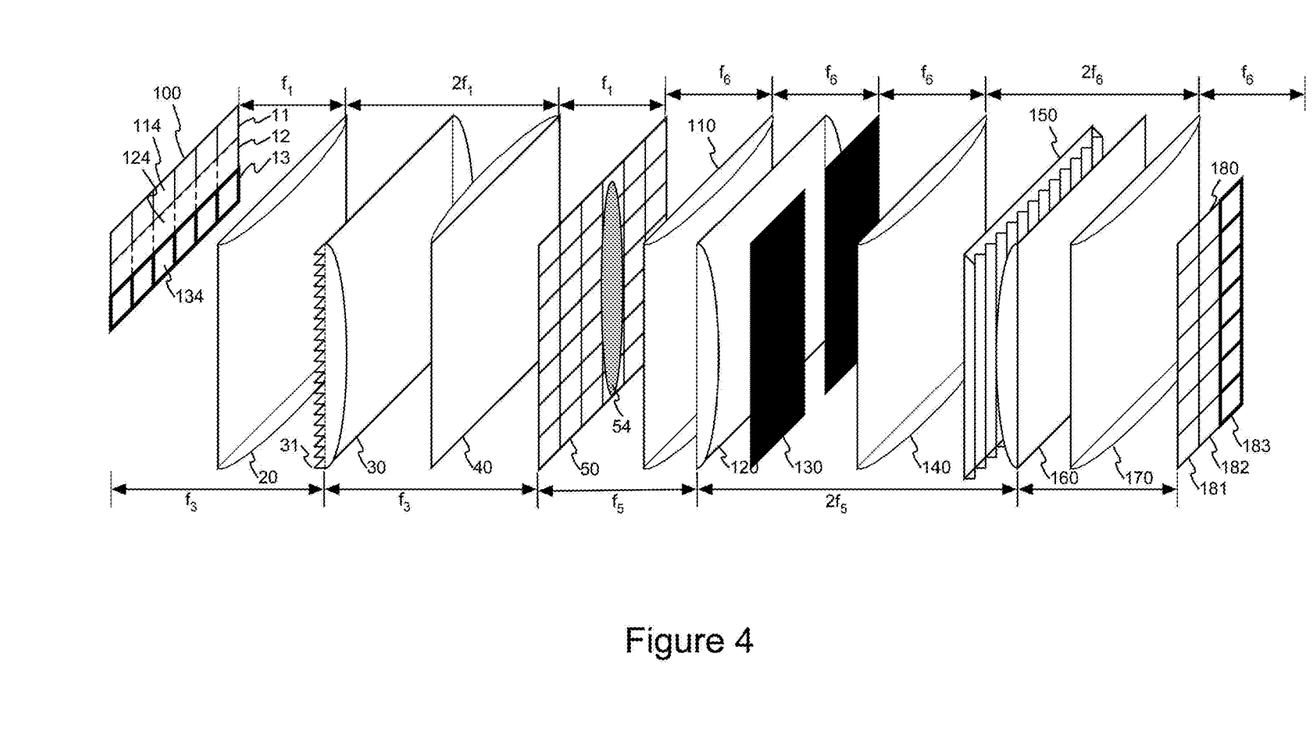
FIG. 4 shows another embodiment of a wavelength multiplexed matrix-matrix multiplier, using a slit to create the summations, and using transmission spatial light modulators.

FIG. 4 shows another embodiment which differs in the back half of the wavelength-multiplexed optical matrix-matrix multiplier. The elements from the input spatial light modulator 100 to the second spatial light modulator 50 are the same as in FIG. 1, however this embodiment has a different summation and spectral dispersion system. FIG. 4 shows the light from the second spatial light modulator 50 imaged in the vertical dimension onto the output 180 by the pair of cylinder lenses 120 and 160. In the horizontal dimension, the light is first focused by cylinder lens 110 onto the slit 130. This focusing of the spatially coherent light gives the Fourier transform of the rows of the spatial light modulator 50. The central lobe of the Fourier transform is proportional to the sum of the values of the light coming from each row. The slit 130 passes substantially only the central lobe of the Fourier transform. The light that passes through the slit is the wavelength multiplexed matrix-matrix multiply summations. In the horizontal dimension, the slit 130 is imaged onto the output 180 by the cylinder pair of lenses 140 and 170. In the middle of this 4-f horizontal cylinder pair imaging there is a grating 150 that disperses the light in the horizontal dimension, giving us the wavelength multiplexed product separated in space. The output at the first three wavelengths is shown as the vectors at the columns labeled 181, 182 and 183. In this version of the system, the output does not require a space variant spectral filter.

Figure 5:
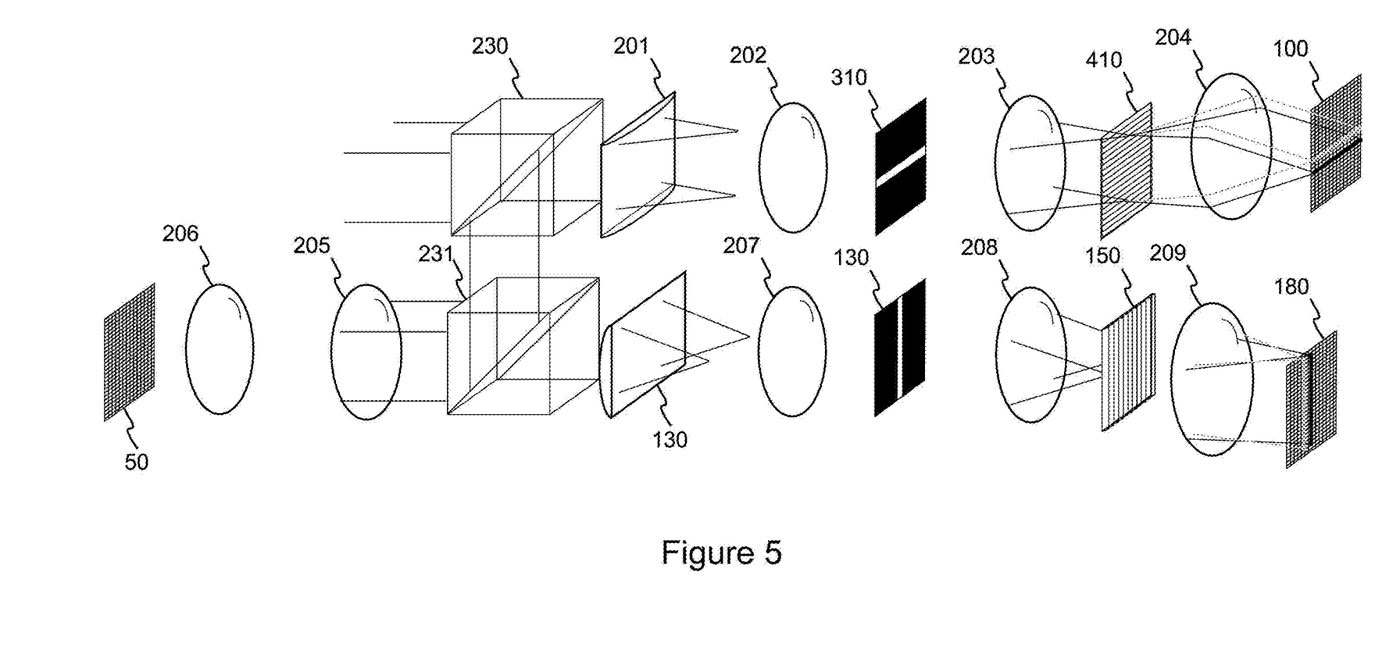
FIG. 5 shows another embodiment of a wavelength multiplexed matrix-matrix multiplier, using a slit to create the summations, and using reflection spatial light modulators.

FIG. 5 shows another embodiment of the wavelength-multiplexed optical matrix-matrix multiplier where the first dimension is the vertical dimension in space and the second dimension is the horizontal dimension in space. In this embodiment, it may be advantageous to use a two-lens, one symmetric about the optical axis and the other cylindrical about the y or x axes for the necessary 4F subsystems, rather than configurations using crossed cylindrical lenses, since aberration performance can be greatly improved. The vertically polarized spatially-coherent multi-wavelength light enters through a first polarizing beam splitter 230. The light is focused to a vertical line by the cylindrical lens 201 and converted to a horizontal line by the spherical lens 202. The horizontal line passes through the horizontal slit 310. Lens 203 converts this back to a vertical line impinging on grating 410. The grating disperses the wavelengths vertically while the lens 204 converts each wavelength to a horizontal line on spatial light modulator 100. The optical train consisting of lenses 201, 202, 203, 204 and the slit 310 and grating 410 illuminate the modulator 100 with coherent light that is spread horizontally across matrix row elements and whose wavelength is dispersed vertically across column elements. The first input matrix on spatial light modulator 100 modulates the amplitude of this light in reflection. A quarter waveplate between beam splitter 230 and spatial light modulator 100, not shown, serves to convert the vertical polarization to horizontal after the double pass through the quarter waveplate. The reflected light from each row of spatial light modulator 100 is imaged by the lens pair 204 and 203 onto the slit 310. The grating 410 serves to combine the rows of different wavelengths onto the same slit 310. Light from the horizontal slit 310 is imaged horizontally and spread vertically by the spherical and cylindrical lens pair 202 and 201. Lenses 205 and 206 image this light onto spatial light modulator 50. The second input matrix on spatial light modulator 50 modulates the amplitudes of all the wavelengths simultaneously. A quarter waveplate between beam splitter 231 and spatial light modulator 50, not shown, serves to convert the horizontal polarization to vertical after the double pass through the quarter waveplate. The optical train consisting of lenses 206, 205, beam splitter 231, and lenses 130, 207 collects the amplitudes of the reflected light from spatial light modulator 50 across the rows at slit 130. Slit 130 filters out the light which is not part of the amplitude sum and that slit is imaged by lenses 208 and 209 onto detector 180. The imaging operation of lenses 208 and 209 includes a grating 150 to separate the wavelengths in the horizontal dimension creating a separate image of the slit for each wavelength. The amplitude of the light at this image is the product of the first input matrix and the second input matrix.

Figure 6A:
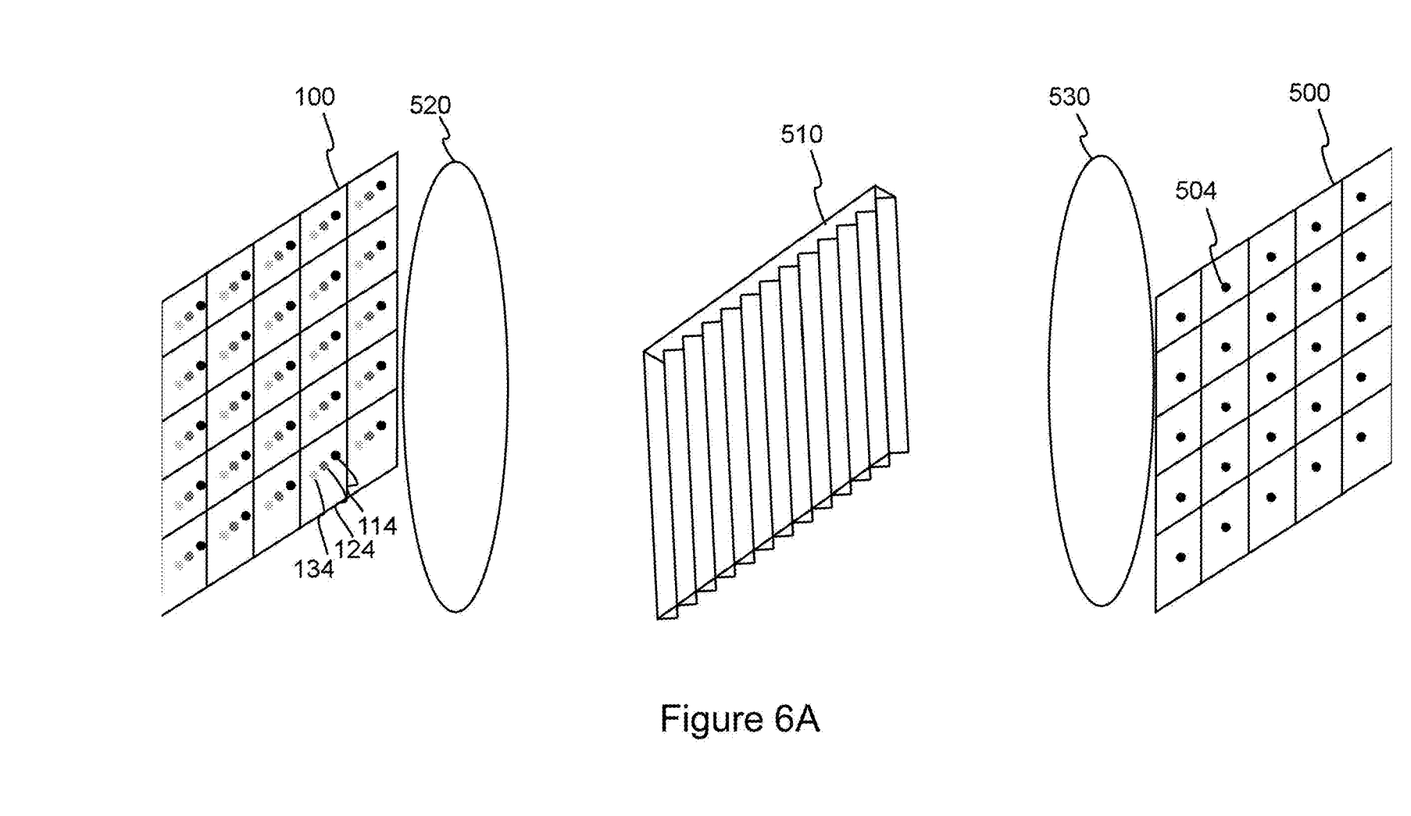
FIGS. 6A, 6B, and 6C show another embodiment of a wavelength multiplexed matrix-matrix multiplier, using a different set of dimensions.
Figure 6B:
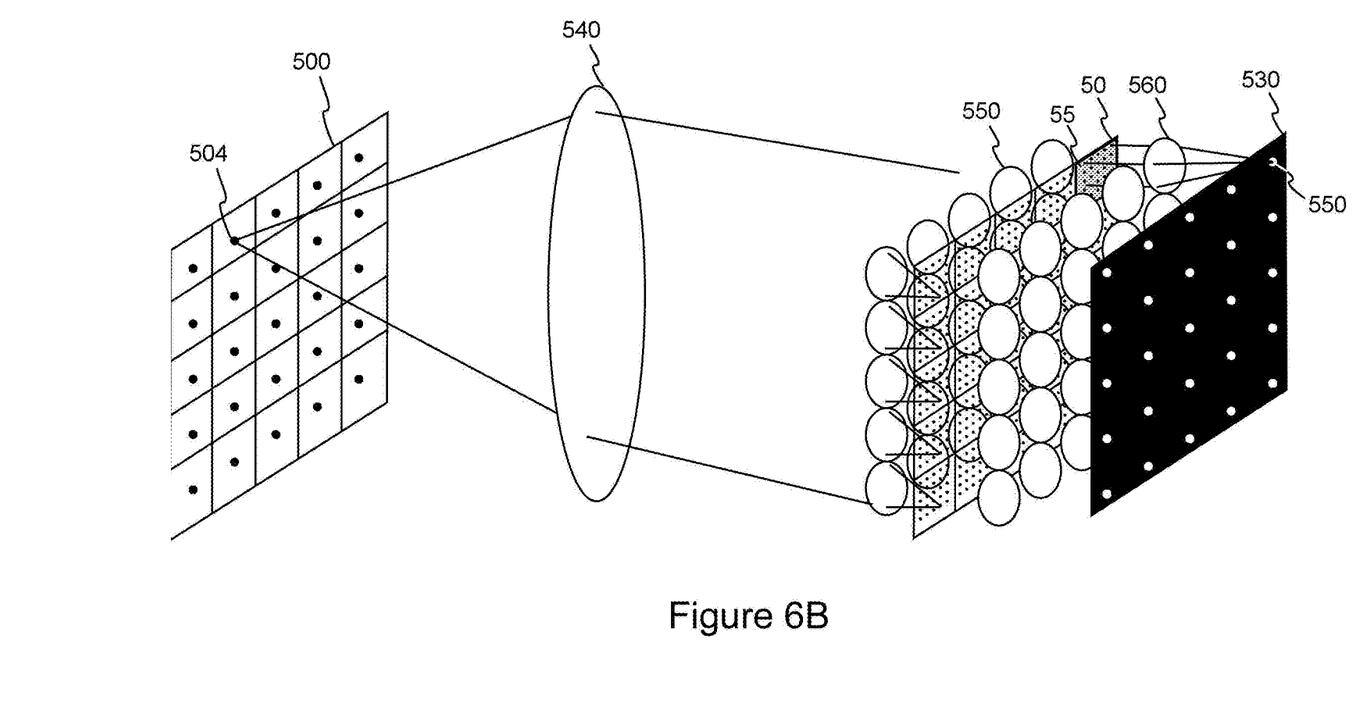
Figure 6C:
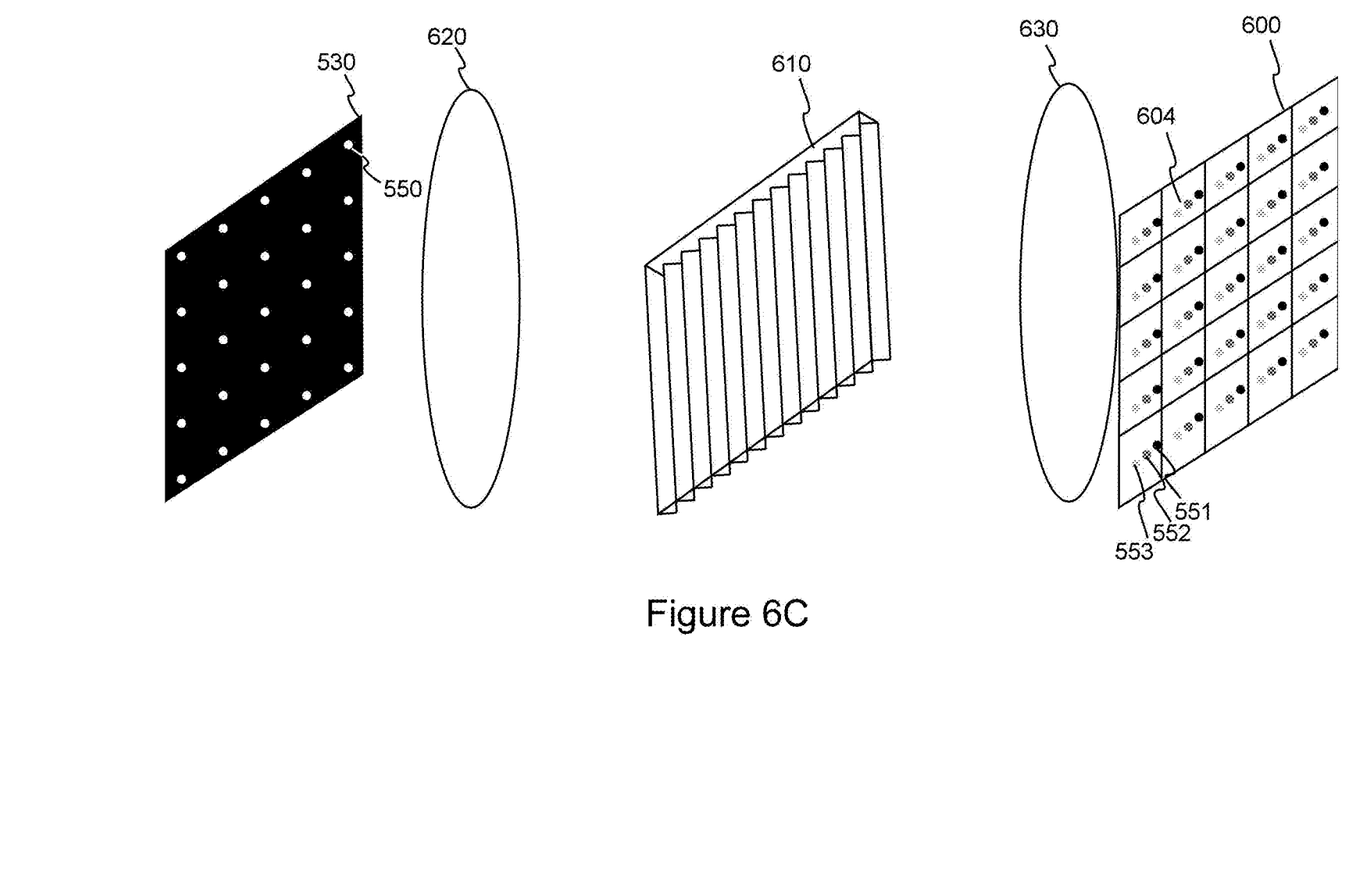

FIGS. 6A-6C show another embodiment of the wavelength-multiplexed optical matrix-matrix multiplier where for the first input matrix, the first dimension is a coarsely-spaced sparse-array rastered horizontally and vertically in the two dimensions of space and the second dimension is a series of copies of the first dimension with finely-spaced offsets. For the second input matrix the first dimension is a coarse array of subarrays rastered horizontally and vertically in the two dimensions of space and the second dimension is a rastered array within each subarray. The output matrix has first and second dimensions like the first input matrix. FIG. 6A, FIG. 6B and FIG. 6C are segments of one optical system with light propagating continuously through all three segments.

FIG. 6A shows a spatial light modulator 100, illuminated by a spatially coherent coarsely-spaced sparse-array at a different wavelength for each row in the input matrix. FIG. 6A shows a matrix row of 25 row elements rastered vertically and horizontally in a 5 by 5 array, and columns of 3 wavelengths for each row with fine offsets at a small angle to the horizontal. It may be advantageous to disperse the wavelengths at a slight angle to the raster direction of the sparse array. The angle allows for more wavelengths than fit between neighboring elements of the sparse array, since the 45 elements can be placed below the elements in a neighboring subarray. The spatial light modulator 100 modulates the amplitude of this light with the 25 by 3 input matrix elements and that light is imaged onto an intermediate plane 500 by the optical train containing (in this embodiment) lens 520, grating 510 and lens 530. Imaging through the grating combines the sparse-arrays of dispersed wavelengths at spatial light modulator 100 together into a single sparse array of wavelength multiplexed rows at intermediate plane 500. So, for example, the optical train brings the light from matrix elements 114, 124 and 134 all to the same spot 504 in the intermediate plane 500.

FIG. 6B shows the continued propagation of the light from FIG. 6A. Light from the sparse array at intermediate plane 500 is collimated by lens 540 onto lenslet array 550. Spatial light modulator 50 is arranged as a 5 by 5 array of subarrays with one subarray behind each lenslet. Each lenslet in lenslet array 550 forms a demagnified image of the sparse array from intermediate plane 500 at spatial light modulator 50, to create a 5 by 5 array within each subarray. Each twenty-five element column of the second input matrix is arranged on one rastered subarray. At each subarray, the spatial light modulator 50 amplitude modulates the wavelength multiplexed rows of the first input matrix by a column of the second input matrix.

The light from each subarray propagates to a lenslet in lenslet array 560. At the back focal plane of each lenslet the light amplitude is an optical Fourier transform of the amplitude of the light within the subarray. The light at this back focal plane is filtered by a pinhole array 530, arranged to select the zero frequency component of the Fourier transform, which is proportional to the sum over the amplitudes on the subarray. FIG. 6B shows how in this embodiment, the light from subarray 55 is collected at pinhole array 530 where the zero frequency component passes through pinhole 550.

FIG. 6C shows the continued propagation of the light from FIG. 6B. Light from pinhole array 530 is imaged onto output plane 600 by the optical train containing lens 620, grating 610 and lens 630. Imaging through the grating separates the light from the sparse-arrays of pinholes at pinhole array 530 to an output matrix with rows of 25 row elements rastered vertically and horizontally in a 5 by 5 array, and columns of 3 wavelengths for each row with fine offsets at a small angle to the horizontal. The wavelength-multiplexed light from pinhole 550 is dispersed to the three element column at spots 551, 552, and 553. The amplitude of the light at this output plane 600 is the product of the first input matrix and the second input matrix.

The terms "vertical", "horizontal", "rows", "columns", and the like are used for convenience in understanding the invention in view of the drawings. Those skilled in the art will appreciate that various changes in orientation do not change the invention. Thus, for example, in both the specification and the claims, vertical and horizontal are defined in relation to each other and not to any particular frame of reference.

While the exemplary preferred embodiments of the present invention are described herein with particularity, those skilled in the art will appreciate various changes, additions, and applications other than those specifically mentioned, which are within the spirit of this invention. For example, one may use reflection spatial light modulators and/or reflection gratings in various combinations to effect the matrix-matrix multiply.

The optical systems as shown, are reversible. Reversing the roles of the output and the first input spatial light modulator, the light propagating in the opposite direction computes the product with the transpose of the second matrix.

The optical systems as shown, where the modulators can also function as detectors and the detectors can also function as modulators, can be used in both forward and reverse direction. Furthermore, with the center spatial light modulator used as a detector, and the light propagating from both ends towards the center, the system can compute sum of outer products of vectors.

The optical matrix-matrix multiply may be advantageous In the application to artificial neural networks, where the sums and products may be done at lower accuracy than some other applications require.

It may be advantageous in the application to artificial neural networks, to use the sparse array format where spatial light modulator is addressed from a backplane with local memory for the data for the first input matrix, making the path from memory to modulator element short.

It may be advantageous in an optical matrix multiplier to employ combinations of diffractive and refractive dispersion in order to more closely linearize the overall dispersion with respect to wavelength.

It may be advantageous in an optical matrix multiplier to design fourier lenses to be symmetric with respect to direction of propagation. This approach provides optimization of aberration performance in a bidirectional system.

It may be advantageous in an optical matrix multiplier to utilize microlens array designs with multiple elements, such as with two substrates yielding 4 aligned powered optical surfaces, such that performance across the microlens field of view can be corrected for Seidel and higher order aberrations. It may also be advantageous in these designs to incorporate either refractively or diffractively powered surfaces or even combinations of the two to optimize performance.

It may be advantageous in an optical matrix multiplier to incorporate an optical reference input in which the reference and signal beams follow a common optical path. This renders the coherent phase relationship between reference and signals to be invariant with variations in the optical system arising from such perturbations as temperature variation and vibration.

It may be advantageous in an optical matrix multiplier to employ a filter whose spatial phase and/or amplitude transfer properties can be either statically or dynamically different depending on the direction in which light traverses the filter plane.

It may be advantageous to perform the spatial light modulation using a phase-only spatial light modulator, such as a twisted nematic liquid crystal, combined with polarization analyzers. In that case it may be advantageous to apply an inverse sine function to the vector and matrix components A_ik and B_lm. Other types of non-ideal spatial light modulators may be accommodated using more general non-linear correction functions.

In an off-axis situation in which one side of a lens must remain telecentric, it may be advantageous to use an appropriately placed, tilted and offset lens in a larger lens subaperture in order to minimize coma and astigmatism. This provides for a path to utilize simple off-the-shelf lenses to produce low-aberration telecentric performance.

Detection of the output amplitude is preferably done by heterodyne detection with interference by a reference beam. That heterodyne reference beam may be aligned with the zero frequency component of the Fourier transform to serve as the method of filtering the light which is not par of the added amplitudes light.

The invention claimed is:

1. The method of optically performing matrix-matrix multiplications comprising the steps of:
    (a) providing spatially coherent light;
    (b) separating the light by wavelength in a first dimension of space;
    (c) spreading the light in a second dimension of space;
    (d) applying first-matrix values to amplitude of the separated and spread light wherein different wavelengths are modulated by different matrix rows;
    (e) combining the modulated light by wavelength over the first dimension;
    (f) spreading the modulated light over the first dimension;
    (g) applying second-matrix values to the combined and spread modulated light wherein matrix rows are applied across the second dimension and matrix columns are applied across the first dimension;
    (h) adding amplitudes of the light from step (g) over the second dimension;
    (i) filtering out light that is not part of the added amplitudes of light; and
    (j) separating the added amplitudes of light by wavelength in the second dimension.

2. The method of claim 1 wherein the first dimension is the vertical dimension and the second dimension is the horizontal dimension.

3. The method of claim 1 wherein, for at least one of the matrices, one of the dimensions is a coarsely-spaced sparse-array rastered horizontically and vertically and the second dimension is a series of offset copies of the sparse-array.

4. The method of claim 3 further including the step of obtaining data for at least one of either first-matrix values or second-matrix values comes from a backplane with a local memory.

5. The method of claim 1 wherein, for at least one of the matrices, one of the dimensions is a rastered array of rastered subarrays.

6. The method of claim 5 further including the step of obtaining data for at least one of either first-matrix values or second-matrix values comes from a backplane with a local memory.

7. The method of claim 1 wherein step (i) is performed by a space variant spectral filter.

8. The method of claim 1 wherein step (i) is performed using a slit.

9. The method of claim 1 wherein step (i) is performed using a pinhole array.

10. The method of claim 1 wherein step (d) and step (g) are performed by some combination of the following:
    transmissive spatial light modulators;
    reflective spatial light modulators;
    multi-quantum-well spatial light modulators.

11. The method of claim 1 wherein at least one of step (b) and step (e) are performed by a grating.

12. The method of claim 1 further including the steps of applying a polarization to the light and using the polarization to route the light.

13. The method of claim 1 further including the step of using the matrix-matrix multiplier in an artificial neural network.

14. Apparatus for optically performing matrix-matrix multiplications comprising:
    a source of spatially coherent light;
    a first dimension separator configured to separate the light by wavelength in a first dimension of space;
    a second dimension spreader configured to spread the light in a second dimension of space;
    a first matrix modulator configured to apply first-matrix values to amplitude of the first-dimension separated and second-dimension spread light wherein different wavelengths are modulated by different matrix rows;
    a combiner configured to combine the first matrix modulated light by wavelength over the first dimension;
    a first dimension spreader configured to spread the first-matrix-modulated light over the first dimension;
    a second matrix modulator configured to modulate the combined and first-dimension spread modulated light such that matrix rows are applied across the second dimension and matrix columns are applied across the first dimension;
    an adder configured to add amplitudes of the second-matrix-modulated light over the second dimension;
    a filter element configured to filter out light that is not part of the added amplitudes of light; and a second dimension separator configured to separate the added amplitudes of light by wavelength in the second dimension.

15. The apparatus of claim 14 wherein the filter element is a space variant spectral filter.

16. The apparatus of claim 14 wherein the filter element is a slit.

17. The apparatus of claim 14 wherein the filter element is a pinhole array, the first matrix modulator and the second matrix are chosen from among the following the following:

transmissive spatial light modulators;

reflective spatial light modulators;

multi-quantum-well spatial light modulators.

18. The apparatus of claim 14 implemented using only two cylindrical lenses.

19. The apparatus of claim 14 further comprising a polarizer configured to polarize the light and optics configured to route the light based on polarization.

20. The apparatus of claim 14 wherein the second-dimension spreader comprises a grating.

\* \* \* \* \*